(12) United States Patent
Kohlndorfer et al.

(10) Patent No.: US 9,744,940 B1
(45) Date of Patent: Aug. 29, 2017

(54) SEATBELT PRETENSIONING RETRACTOR ASSEMBLY

(71) Applicant: Autoliv ASP, Inc., Ogden, UT (US)

(72) Inventors: Kenneth H. Kohlndorfer, Roseville, MI (US); Christopher D. Hall, Ogden, UT (US); Richard Koning, Ogden, UT (US); Chris Koprowicz, Macomb, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/097,729

(22) Filed: Apr. 13, 2016

(51) Int. Cl.
| | |
|---|---|
| *B60R 22/28* | (2006.01) |
| *B60R 22/46* | (2006.01) |
| *B60R 22/36* | (2006.01) |
| B60R 22/34 | (2006.01) |

(52) U.S. Cl.
CPC .......... *B60R 22/4628* (2013.01); *B60R 22/36* (2013.01); *B60R 2022/3402* (2013.01); *B60R 2022/4642* (2013.01)

(58) Field of Classification Search
CPC ........ B60R 22/4628; B60R 2022/4642; B60R 2022/468
USPC ..................... 280/806, 807; 242/374; 60/632
See application file for complete search history.

(56) References Cited

U.S. PATENT DOCUMENTS

| | | | |
|---|---|---|---|
| 4,444,010 A | 4/1984 | Bendler | |
| 5,697,571 A * | 12/1997 | Dybro | B60R 22/4628 242/374 |
| 5,881,962 A * | 3/1999 | Schmidt | B60R 22/4628 242/374 |
| 6,419,176 B1 * | 7/2002 | Mizuno | B60R 22/4628 242/374 |
| 7,887,095 B2 | 2/2011 | Bieg et al. | |
| 8,042,835 B2 | 10/2011 | Bieg et al. | |

(Continued)

FOREIGN PATENT DOCUMENTS

| | | |
|---|---|---|
| DE | 20 2006 004 748 U1 | 4/2007 |
| DE | 10 2006 031 359 A1 | 10/2007 |

(Continued)

OTHER PUBLICATIONS

Jon Burrow et al., U.S. Appl. No. 12/830,792, Entitled "High Seal Retractor Pretensioner Piston," filed Jul. 6, 2010, 25 pgs.

(Continued)

*Primary Examiner* — Toan To
(74) *Attorney, Agent, or Firm* — Brinks Gilson & Lione

(57) ABSTRACT

A seatbelt pretensioning retractor assembly for use in a passenger vehicle is provided. The pretensioning assembly includes a tube in fluid communication with a gas generator and a driving element disposed therein that travels in a first direction in response to actuation of the gas generator. The driving element includes a plastically deformable polymer rod with a recessed portion. A stopper is coupled to an end portion of the plastically deformable polymer rod. A seal member is disposed between the gas generator and the stopper. The tube includes a projection extending within the tube adjacent to the exit to define a constriction portion. The constriction portion is sized to permit the recessed portion of the plastically deformable polymer rod to pass therethrough while preventing the stopper from passing therethrough.

20 Claims, 12 Drawing Sheets

(56) References Cited

U.S. PATENT DOCUMENTS

| | | | |
|---|---|---|---|
| 8,371,613 B2* | 2/2013 | Hodatsu | B60R 22/4628 |
| | | | 242/374 |
| 8,393,644 B2 | 3/2013 | Lee | |
| 8,887,095 B2 | 11/2014 | Krishnamurthy et al. | |
| 9,475,455 B2* | 10/2016 | Gray | B60R 22/4628 |
| 9,555,768 B2* | 1/2017 | Gray | B60R 22/4628 |
| 2001/0035472 A1 | 11/2001 | Hamaue | |
| 2010/0051733 A1* | 3/2010 | Yamada | B21C 23/205 |
| | | | 242/374 |
| 2010/0090449 A1* | 4/2010 | Thomas | B60R 21/207 |
| | | | 280/733 |
| 2011/0011969 A1* | 1/2011 | Ogawa | B60R 22/4676 |
| | | | 242/374 |
| 2011/0316265 A1* | 12/2011 | Lane, Jr. | B60R 22/1955 |
| | | | 280/806 |
| 2012/0160947 A1* | 6/2012 | Nagata | B60R 22/4628 |
| | | | 242/374 |
| 2013/0062450 A1* | 3/2013 | Fischer | B60R 22/4628 |
| | | | 242/374 |
| 2013/0327872 A1 | 12/2013 | Gentner et al. | |
| 2013/0327873 A1 | 12/2013 | Gentner et al. | |
| 2014/0014758 A1 | 1/2014 | Gentner et al. | |
| 2014/0084099 A1* | 3/2014 | Miyoshi | B60R 22/4633 |
| | | | 242/374 |
| 2015/0336538 A1 | 11/2015 | Gray et al. | |
| 2015/0336539 A1 | 11/2015 | Gray et al. | |

FOREIGN PATENT DOCUMENTS

| | | |
|---|---|---|
| DE | 10 2006 031 360 A1 | 10/2007 |
| DE | 10 2006 031 369 A1 | 10/2007 |
| DE | 10 2010 051 463 A1 | 5/2012 |
| DE | 10 2010 054 846 A1 | 6/2012 |
| DE | 10 2011 016 153 A1 | 10/2012 |
| DE | 10 2010 054 845 A1 | 3/2013 |
| DE | 10 2012 019 004 A1 | 3/2014 |
| WO | WO 2012/065654 A1 | 5/2012 |
| WO | WO 2012/065655 A1 | 5/2012 |
| WO | WO 2012/065656 A1 | 5/2012 |
| WO | WO 2012/065672 A1 | 5/2012 |
| WO | WO 2013 156122 A1 | 10/2013 |
| WO | WO 2014/194993 A1 | 12/2014 |

OTHER PUBLICATIONS

Gunter Clute, U.S. Appl. No. 11/115,583, Entitled "Pretensioner Device for a Seatbelt Retractor," filed Apr. 27, 2005, 20 pgs.

Non-Final Office Action from U.S. Appl. No. 14/286,087, Dated Nov. 18, 2015.

Non-Final Office Action from U.S. Appl. No. 14/286,184, Dated Nov. 16, 2015.

* cited by examiner

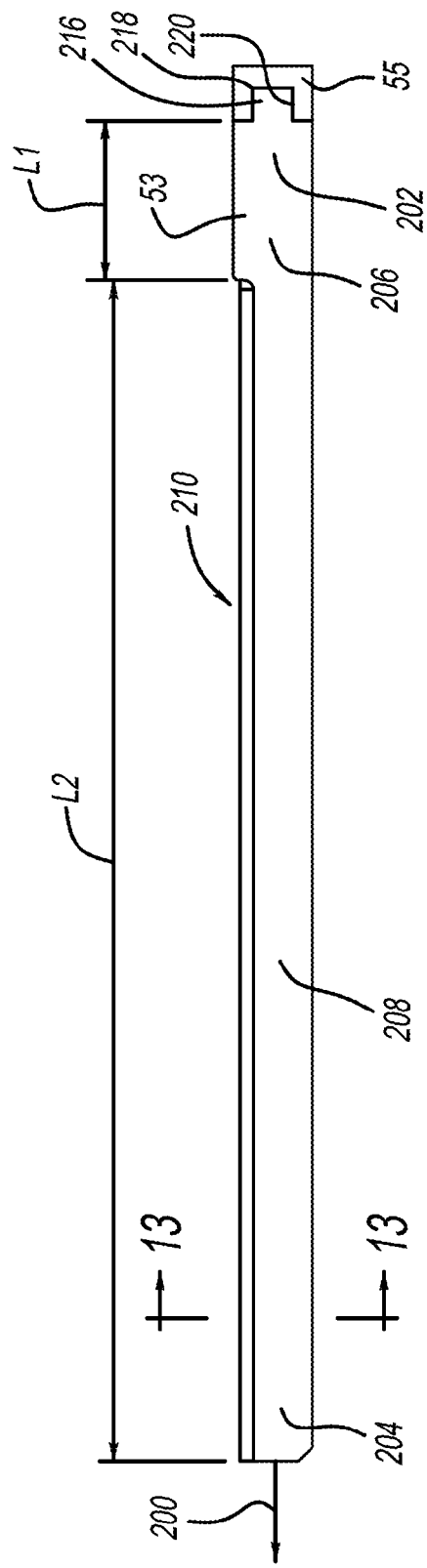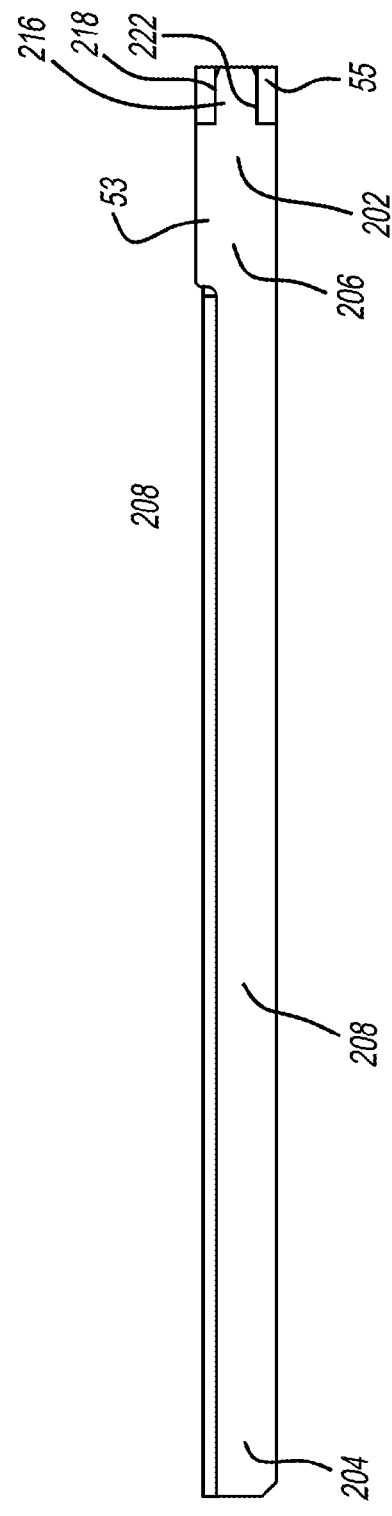
FIG-5
FIG-6

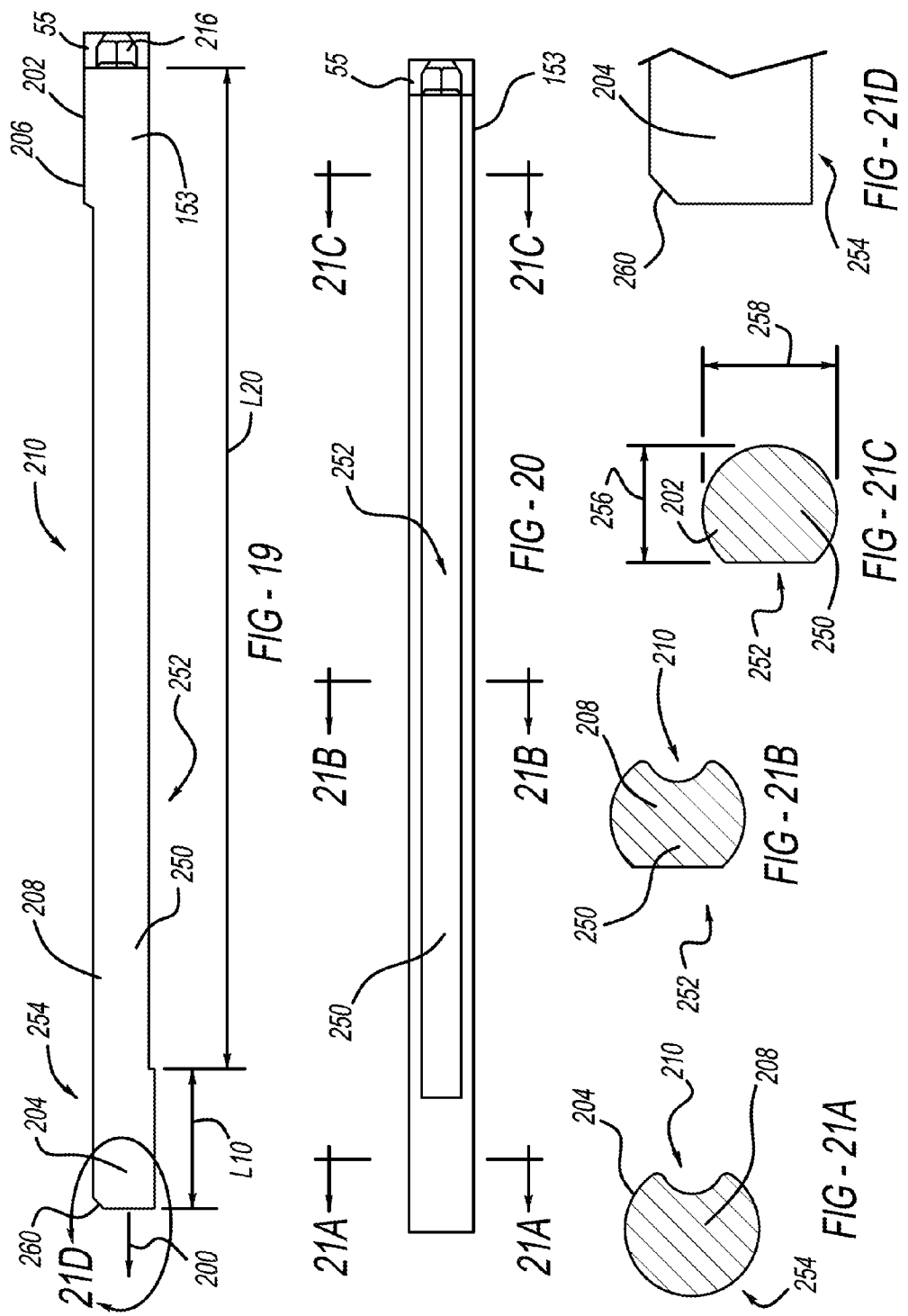

SEATBELT PRETENSIONING RETRACTOR ASSEMBLY

TECHNICAL FIELD

The technical field relates generally to seatbelt restraint devices for restraining an occupant of a vehicle, and more particularly, to devices for pretensioning a seatbelt.

BACKGROUND

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either during an impact of the vehicle or even prior to impact (also known as a "pre-pretensioner") to enhance occupant restraint performance. The pretensioner takes out slack in the webbing and permits the belt restraint system to couple with the occupant early in the crash sequence. One type of pretensioner acts on the webbing retractor to tension the belt. Various designs of retractor pretensioners presently exist, including a type known as a roto-pretensioner that incorporates a gas generator for generating a pyrotechnic charge. Examples of such roto-pretensioners are described in U.S. Pat. No. 5,881,962, filed Apr. 11, 1995, U.S. Patent Application Publication No. 2006/0243843, filed Apr. 27, 2005, U.S. Patent Application Publication No. 2012/0006925, filed Jul. 6, 2010, and U.S. Pat. No. 7,988,084, filed Aug. 2, 2011, which are commonly owned by the assignee of the present application and are hereby incorporated by reference in their entirety for all purposes. Generally, ignition of the pyrotechnic charge or other combustible material creates gas pressure in a chamber having a piston to impart motion upon a driving element such as a piston, rack and pinion, or series of balls disposed in a pretensioner tube, which engage with and wind a retractor spool sprocket to retract the webbing.

One issue with pretensioners using a series of metallic balls is the weight of the series of balls required for a full pretensioning stroke, as well as the corresponding cost of supplying multiple metallic balls with strict tolerances. Further, for pretensioners using a series of metallic balls, or rack and pinion based systems, is the need for a synchronizing or clutch feature to ensure that the series of balls or pinion sufficiently engage the retractor spool sprocket.

Another issue with pretensioners is known as a low resistance condition, where the driving elements will reach an end of stroke without experience substantial resistance. This can occur if there is excessive slack in the seatbelt webbing. In these cases, the low resistance results in a lower amount of backpressure from the driving elements. The backpressure is produced by the engagement between the driving elements and the sprocket, so lower backpressure reduces the pressure on a sealing element that trails the driving elements. Reduced pressure on the sealing elements reduces the amount that the sealing element is compressed circumferentially. Reduced sealing ability can cause gas to leak from the tube around the series of balls.

A further issue with pretensioners is the need to maintain the retractor and the seatbelt webbing in a locked condition at the end of the pretensioning stroke. When the retractor spool does not remain locked, payback can occur which allows the seatbelt to unspool and reintroduce slack in the seatbelt. One method for maintaining the locked position includes maintaining pressure from the gas generator beyond the amount needed for the pretensioning stroke. However, this adds weight and cost.

BRIEF SUMMARY

Seatbelt pretensioning retractor assemblies for use in a passenger vehicle are provided herein. In an exemplary embodiment, a seatbelt pretensioning retractor assembly includes a housing that is adapted for being mounted to a vehicle structure. The housing has an interior cavity. A tube with an arcuate and curved shape has a first end for fluid communication with a gas generator and a second end in fluid communication with the interior cavity of the housing. A sprocket is rotatably mounted to the housing and fixedly coupled to a spindle that is adapted for taking up seatbelt webbing during pretensioning. The sprocket has a plurality of vanes. A driving element includes a plastically deformable polymer rod that is configured to extend in a longitudinal direction and has a recessed portion defining a recess that extends generally in the longitudinal direction. The plastically deformable polymer rod is disposed within the tube and is translatable through the tube in a first direction toward the sprocket in response to an actuation by the gas generator. A stopper is coupled to an end portion of the plastically deformable polymer rod. A seal member is disposed between the gas generator and the stopper. The tube includes a projection extending inside the tube adjacent to the exit to define a constriction portion. The constriction portion has an opening dimension smaller than an inside dimension of adjacent portions of the tube. The recess is aligned with the projection in the first direction and the constriction portion is sized to permit the recessed portion of the plastically deformable polymer rod to pass therethrough while preventing the stopper from passing therethrough.

In another exemplary embodiment, a seatbelt pretensioning retractor assembly for use in a passenger vehicle is provided. The seatbelt pretensioning retractor assembly includes a housing adapted for being mounted to a vehicle structure and has an interior cavity. A tube has an arcuate and curved shape having a first end for fluid communication with a gas generator and a second end in fluid communication with the interior cavity of the housing. A sprocket is rotatably mounted to the housing and fixedly coupled to a spindle adapted for taking up seatbelt webbing during Pretensioning. The sprocket has a plurality of vanes. A driving element includes a plastically deformable polymer rod configured to extend in a longitudinal direction and has a recessed portion defining a recess that extends generally in the longitudinal direction. A recessed section extends in the longitudinal direction on a side opposite the recessed portion. The plastically deformable polymer rod is disposed within the tube and is translatable through the tube in a first direction toward the sprocket in response to an actuation by the gas generator. A seal member is disposed between the gas generator and the plastically deformable polymer rod. The tube includes a projection extending within the tube adjacent to the exit to define a constriction portion that has an opening dimension smaller than an inside dimension of adjacent portions of the tube. The recess, which is defined by the recessed portion in the plastically deformable polymer rod, is aligned with the projection in the first direction and the constriction portion is sized to permit the recessed portion of the plastically deformable polymer rod to pass therethrough. The recessed section is sized such that a thickness of the plastically deformable polymer rod defined normal to the recessed section is less than a width of the plastically deformable polymer rod defined normal to the thickness to facilitate bending of the plastically deformable polymer rod through the tube during translation in the first direction.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way.

FIG. 5 is a side cut-away view of the plastically deformable polymer rod and a stopper in accordance with an exemplary embodiment;

FIG. 6 is a side cut-away view of the plastically deformable polymer rod and the stopper in accordance with another exemplary embodiment;

FIG. 19 is a side cut-away view of the plastically deformable polymer rod and a stopper in accordance with another exemplary embodiment;

FIG. 20 is a plan view of the plastically deformable polymer rod and a stopper depicted in FIG. 19;

FIGS. 21A-21C are cross-sectional views of the plastically deformable polymer rod depicted in FIG. 20; and FIG. 21D is an enlarged view of a portion of the plastically deformable polymer rod depicted in FIG. 19.

It should be understood that throughout the drawings, corresponding reference numerals indicate like or corresponding parts and features.

DETAILED DESCRIPTION OF THE INVENTION

The following description is merely exemplary in nature and is not intended to limit the present disclosure or its application or uses.

Figure 1:
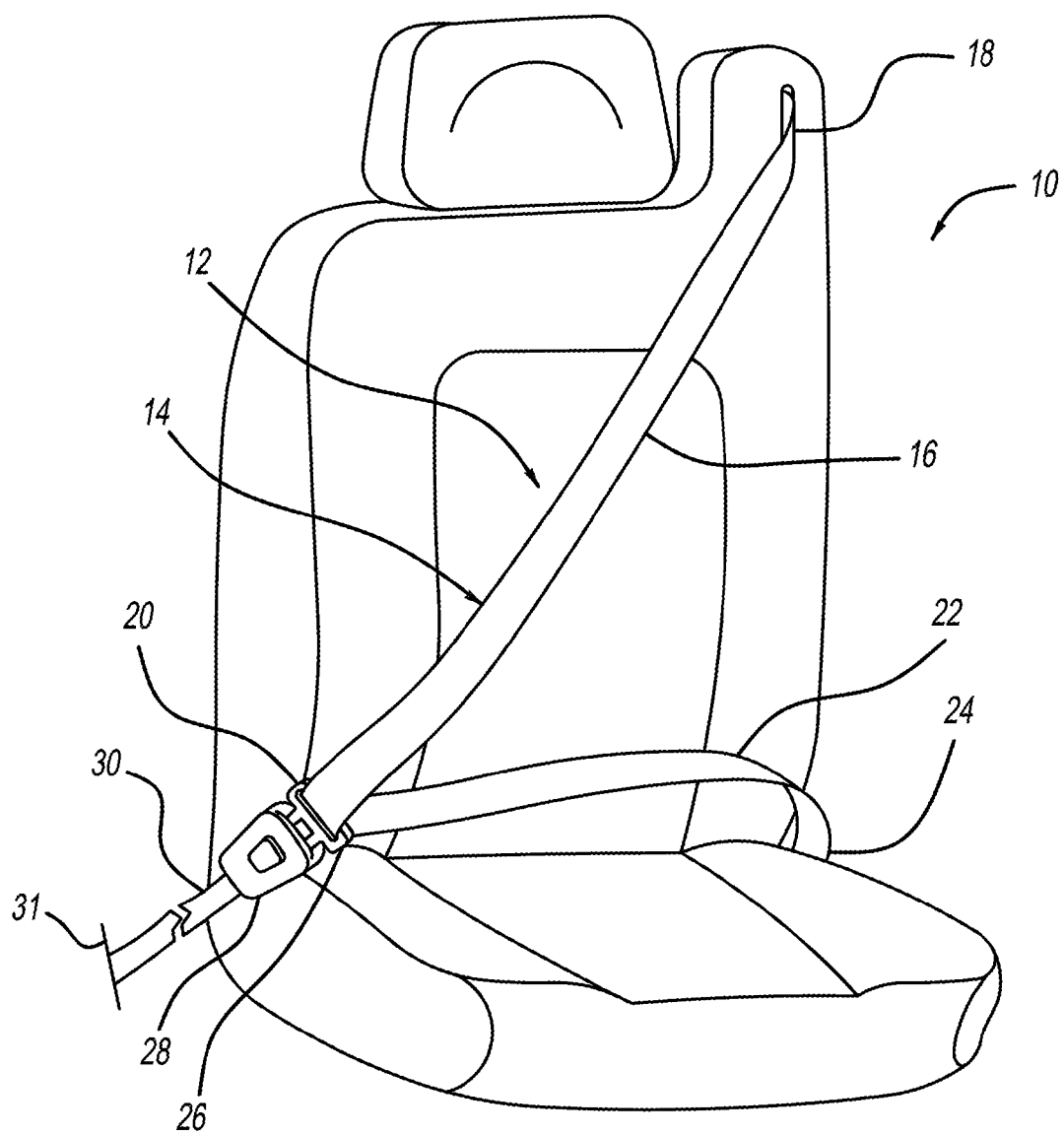
FIG. 1 is perspective view of an occupant restraint system in accordance with an exemplary embodiment.

Referring now to the drawings, FIG. 1 shows a vehicle seat 10 and a seatbelt assembly 12 in accordance with an exemplary embodiment. The seatbelt assembly 12 includes a seatbelt webbing 14 having a shoulder belt portion 16 extending from an upper guide loop or anchorage 18 to a latch plate 20 and a lap belt portion 22 extending from the latch plate 20 to an anchorage 24. The latch plate 20 can include a loop portion 26 through which the seatbelt webbing 14 extends. The latch plate 20 is able to be inserted into a seatbelt buckle 28 to lock and unlock the seatbelt assembly 12. A seatbelt buckle cable 30, either directly or in cooperation with other components, secures the seatbelt buckle 28 to a portion 31 of the vehicle structure (e.g., vehicle frame). It will be appreciated that other manners of attaching the seatbelt webbing 14 to vehicle could also be used, including variations on the latch plate 20 and the seatbelt buckle 28 and their attachments to the seatbelt webbing 14 and associated vehicle structure.

The seatbelt webbing 14 is able to pay-out from a seatbelt pretensioning retractor assembly or retractor assembly 32 (shown in FIGS. 2 and 3), which is located within the vehicle seat 10 (in an integrated structural seat design) or is coupled structurally to the vehicle body, so that the effective length of the seatbelt webbing 14 is adjustable. When the latch plate 20 has been fastened to the seatbelt buckle 28, the seatbelt assembly 12 defines a three-point restraint between the anchorage 18, the latch plate 20, and the anchorage 24. Any other suitable configurations, such as alternative locations for the retractor assembly 32, the latch plate 20, and the anchorage 24, may be used with the present invention.

Figure 2:
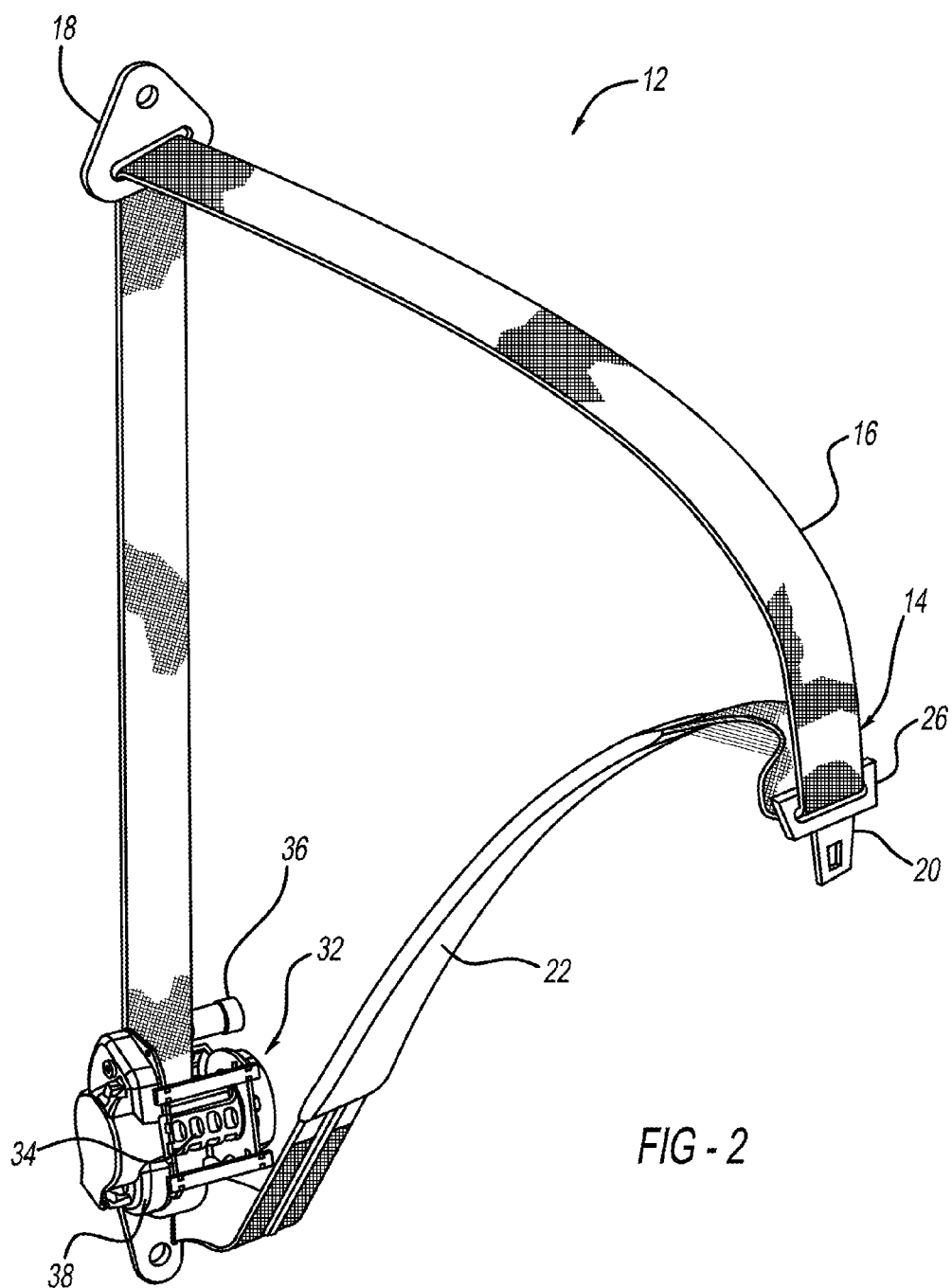
FIG. 2 is a perspective view of the occupant restraint system with various components removed to show a seatbelt pretensioning retractor assembly in accordance with an exemplary embodiment.

Now with reference to FIG. 2, an isometric view of the seatbelt assembly 12 is illustrated disassociated from the motor vehicle and showing the retractor assembly 32 in accordance with an exemplary embodiment. The retractor assembly 32 includes a spool assembly 34 and a gas generator 36 mounted to a common frame 38. The spool assembly 34 is connected with and stows the seatbelt webbing 14 of the shoulder belt portion 16, whereas the end of the lap belt portion 22 of the seatbelt webbing 14 is fixedly engaged with the anchorage point, for example, the frame 38 or another portion of the motor vehicle such as the seat 10 (shown in FIG. 1) or floor pan.

Figure 3:
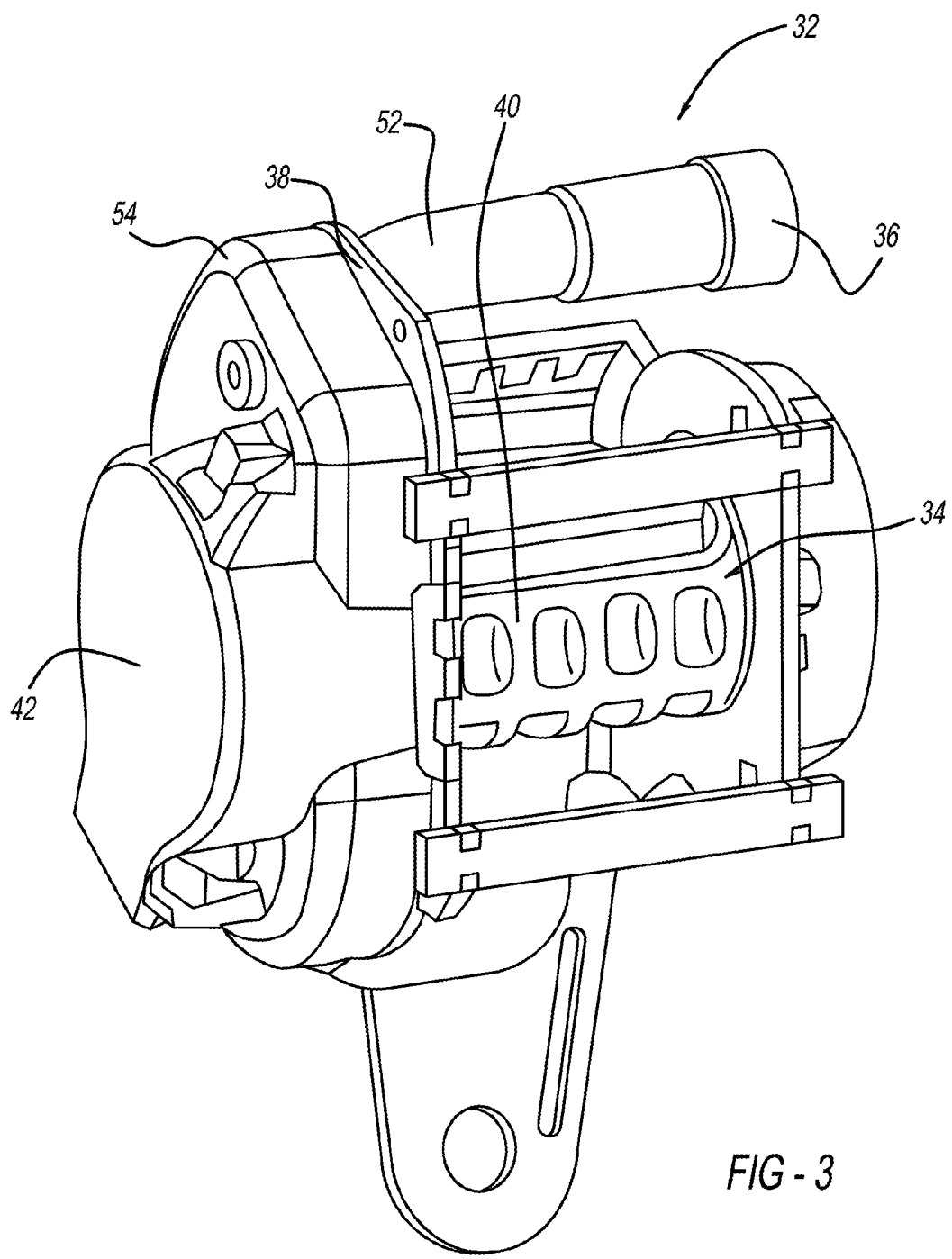
FIG. 3 is a perspective view of the seatbelt pretensioning retractor assembly in accordance with an exemplary embodiment.

Referring also to FIG. 3, the spool assembly 34 includes a belt spool 40 that engages the shoulder belt portion 16 of the seatbelt webbing 14 and rotates to wind-up or pay-out the seatbelt webbing 14. A torsional "clock" or "motor" type spring is carried within a spring end cap 42 and rotationally biases the belt spool 40 to retract the seatbelt webbing 14. The spool assembly 34 may further incorporate other spool control mechanisms that are known in accordance with the prior art, including pretensioners, inertia and webbing sensitive locking devices, torsion bar load limiters, or other belt control devices. "Spool control systems" referred to in this specification may include any system that controls the rotational movement of a webbing spool, thus controlling the extraction and retraction of seatbelt webbing. One such spool control system is a motor-assisted retractor. Spool locking devices typically incorporate an inertia sensitive element, such as a rolling ball or pendulum, and cause a sprocket of the spool to be engaged to prevent further withdrawing of the seatbelt webbing 14 from the belt spool 40. Webbing sensitive locking devices sense rapid pay-out of seatbelt webbing 14 to lock the retractor assembly 32. Various electronic sensing mechanisms that detect the withdrawal of seatbelt webbing 14 and/or the connection of the latch plate 20 to the seatbelt buckle 28 may also be incorporated into the retractor assembly 32.

During normal operation of the vehicle, the retractor assembly 32 allows pay-out of seatbelt webbing 14 to give the occupant a certain amount of freedom of movement. However, if an impact or a potential impact situation is detected, the retractor assembly 32 is locked to prevent pay-out and to secure the occupant in the seat 10. For example, if the vehicle decelerates at a predetermined rate or if the brakes are actuated with a predetermined force, then the retractor assembly 32 is locked. Due in part to the free pay-out of the seatbelt webbing 14, the seatbelt assembly 12 often develops slack during normal use.

Figure 4:
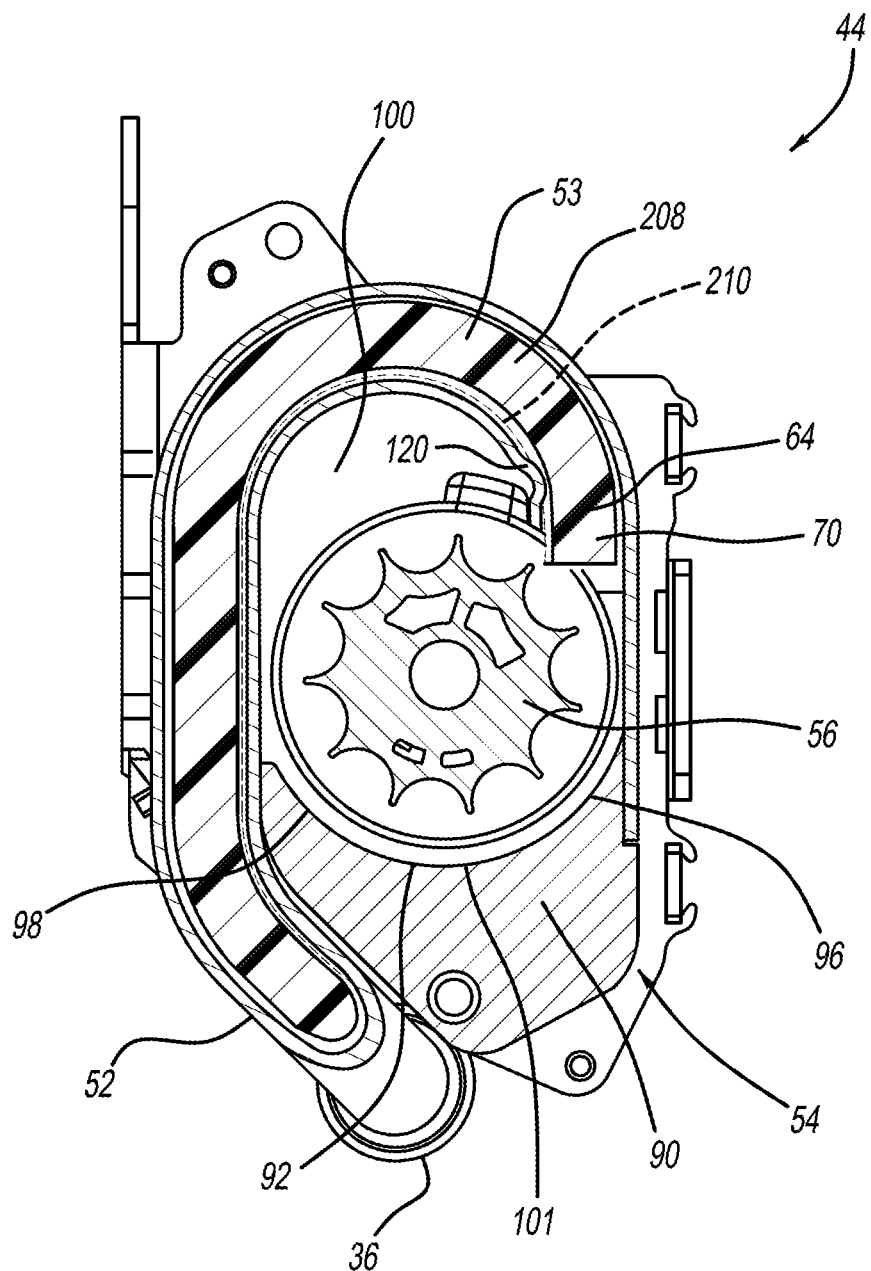
FIG. 4 is a cut-away view of the seatbelt pretensioning retractor assembly illustrating a tube, a plastically deformable polymer rod, and a sprocket in a non-actuated position in accordance with an exemplary embodiment.

FIG. 4 provides a cut-away illustration of a pretensioner system 44 in accordance with an exemplary embodiment. Referring to FIGS. 3-4, in particular, the retractor assembly 32 further incorporates the pretensioner system 44 operatively connected to the spool assembly 34 and operable to rotate the belt spool 40 for pretensioning. As known to those of skill in the art, a retractor pretensioner winds seatbelt webbing into a more taught condition against the occupant at the initial stages of a detected vehicle impact. This is provided to reduce forward motion or excursion of the occupant in response to the deceleration forces of a vehicle impact or rollover.

The pretensioner system 44 includes a pretensioner tube 52 in communication with the gas generator 36. The gas generator 36 is used to provide expanding gas in response to a firing signal. As is known in the art, for example, the vehicle includes a sensor array sending a signal indicative of an emergency event such as an impact event, crash, or rollover. The vehicle sensor may be a specific impact sensor, or may be a traditional vehicle sensor (e.g. a longitudinal or lateral acceleration sensor) or otherwise part of a control system having a suite of multiple sensors. Any other impact sensor that is or will be known to those skilled in the art may also be readily employed in conjunction with the seatbelt assembly 12 of present invention. An electronic control unit such as a central processing unit (CPU) or other controller receives a signal and controls the seatbelt assembly 12 to respond by tightening the seatbelt webbing 14 of the vehicle (e.g. via activation of a pretensioner).

As will be discussed in further detail below, the pretensioner tube 52 has a pretensioner rod 53, e.g., a plastically deformable polymer rod, disposed therein that has an elongate shape and is flexible within the tube 52. More specifically and as will be discussed in further detail below, the pretensioner rod 53, when disposed outside of the pretensioner tube 52 prior to insertion therein, has a generally straight shape, and when inserted into the tube 52 it will bend and flex in accordance with the tortuous shape of the tube 52.

Turning now to the retractor assembly 32, the retractor assembly 32 includes the spool assembly 34 mounted to the common frame 38, as described above. More particularly, the spool assembly 34 will rotate relative to the common frame 38 to wind the seatbelt webbing 14 attached to the spool assembly 34. The common frame 38 includes a housing 54 for housing the components of the pretensioner system 44.

The spool assembly 34 includes a sprocket 56 that is disposed within the housing 54. The sprocket 56 is attached to the belt spool 40. Rotation of the sprocket 56 will cause the attached belt spool 40 to rotate to wind the seatbelt webbing 14 that is attached to the belt spool 40.

Figures 13A, 13B, 13C:
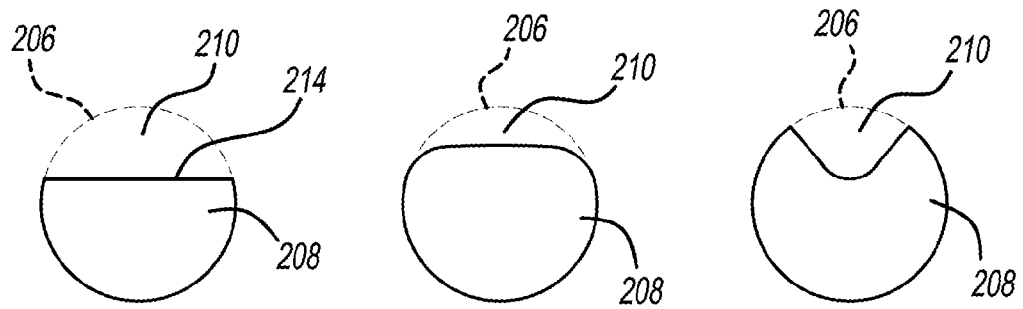
FIGS. 13A-13E are cross-sectional views of various embodiments of the plastically deformable polymer rod illustrated in FIG. 5 along line 13-13.
Figures 13D, 13E:
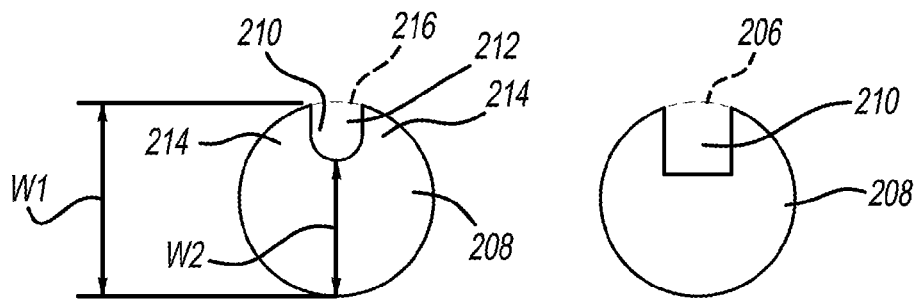
Figure 14:
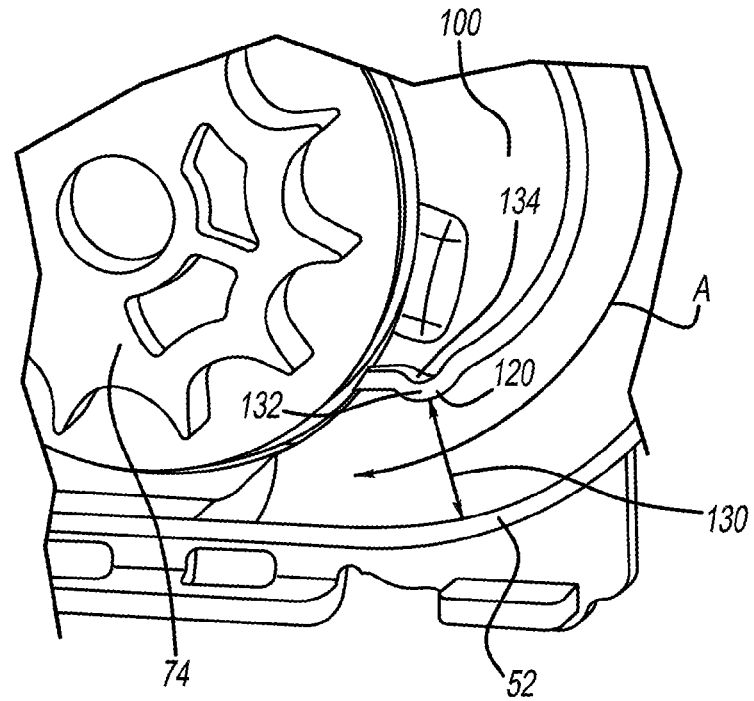
FIG. 14 is a cut-away perspective view of a constriction portion in the tube of the seatbelt pretensioning retractor assembly in accordance with an exemplary embodiment.

FIG. 5 provides a side cut-away illustration of the pretensioner rod 53 and a stopper 55 in accordance with an exemplary embodiment. FIGS. 13A-13E provide cross-sectional views of various embodiments of the pretensioner rod 53 illustrated in FIG. 5 along line 13-13. As shown in FIGS. 5 and 13A-13E, the pretensioner rod 53 has a generally circular cross-section in one form. In another approach, the pretensioner rod 53 could have a non-circular cross-section, such as a generally rectangular cross-section, generally triangular cross-section, or other polygonal cross-section that allows the pretensioner rod 53 to be inserted into the pretensioner tube 52 (shown in FIG. 4) and adapt to the tortuous shape of the pretensioner tube 52 when inserted. For purposes of discussion, the pretensioner rod 53 will be discussed as having a generally circular cross-section As illustrated and as discussed above, the pretensioner rod 53, when disposed outside of the pretensioner tube 52, has a generally straight shape and extends in a longitudinal direction 200 from a proximal end portion 202 to a distal end portion 204. The proximal end portion 202 is disposed towards the gas generator 36 (shown in FIG. 10) when the pretensioner rod 53 is installed within the pretensioner system 44. In an exemplary embodiment, the pretensioner tube 52 has a cross-section that varies along its length to define a non-recessed portion 206 and a recessed portion 208 that defines a recess 210. In one example and as illustrated in FIGS. 5 and 13D, the recess 210 is configured as a groove 212, e.g., U-shaped groove with sidewalls 214. In another example and as illustrated in FIG. 13A, the recessed portion 208 has a recessed ruled surface 214, e.g., substantially flat surface, that defines the recess 210. Non-limiting alternative examples of different forms of the recess 210 are illustrated in FIGS. 13B-13C and 13E.

Referring to FIG. 5, in an exemplary embodiment, the recessed portion 208 extends along a majority of the overall length of the pretensioner rod 53 from the proximal end portion 202 to and including the distal end portion 204. As illustrated, the proximal end portion 202 includes the non-recessed portion 206 in which the recess 210 terminates at a distal-most section of the non-recessed portion 206. As will be discussed in further detail below and as illustrated in FIGS. 5 and 13A-13E, the non-recessed portion 206 of the pretensioner rod 53 has a diameter, cross-sectional dimension, and/or perimeter greater than the recessed portion 208. In an exemplary embodiment, the non-recessed portion 206 has a length L1 of from about 15 to about 25 mm, such as about 20 mm and a width W1 of from about 4 to about 7 mm, and the recessed portion 208 has a length L2 of from about 60 to about 145 mm and a thickness W2 of from about 2.5 to about 8.0 mm.

In an exemplary embodiment, the pretensioner rod 53 also includes a positive feature 216, e.g., nub or post, extending proximally from the proximal end portion 202. The stopper 55 has a negative feature 218 formed therein that receives the positive feature 216 to couple the stopper 55 to the proximal end portion 202 of the pretensioner rod 53. In one example, the negative feature 218 and the positive feature 216 are sized such that the stopper 55 is compression fit, e.g., interference fit, onto the positive feature 216 to fixedly couple the stopper 55 to the pretensioner rod 53. Other forms of coupling and/or fixing the stopper 55 to the positive feature 216 and/or the proximal end portion 202 may be used, such as, for example, an adhesive, mechanical means, or the like. As illustrated in FIG. 5, the positive feature 218 can be configured as a blind hole 220. Alternatively and as illustrated in FIG. 6, the negative feature 220 can be configured as a through-hole 222 with the positive feature 216 extending partially or fully therethrough.

In an exemplary embodiment, the pretensioner rod is made from a polymer material, which has a reduced weight relative to metallic ball driving elements of other roto-pretensioners. The particular polymer material can be selected to fit the particular desires of the user. The polymer material is preferably one that has sufficient flexibility such that it can bend and flex through the pretensioner tube 52 to allow for initial installation as well as in response to actuation by the gas generator 36. The polymer material is preferably one that has sufficient pushability in response to actuation, such that the pretensioner rod 53 will sufficiently transfer a load to a sprocket 56 of the pretensioner system 44, thereby functioning as a driving element for causing pretensioning.

Further, in an exemplary embodiment, the pretensioner rod 53 is made from a polymer material that is plastically deformable. During and after actuation, the pretensioner rod 53 will be become plastically deformed in response to actuation and contact with other components (e.g., the sprocket 56) of the pretensioner system 44. As will be discussed in further detail below, this plastic deformation will cause the pretensioner rod 53 to become locked, for example, in the sprocket 56 to prevent or limit payback of the pretensioner rod 53 without being completely dependent on maintained pressure in the system.

In one approach, the pretensioner rod 53 is made from a nylon thermoplastic material. The pretensioner rod 53 could also be made from a aliphatic polyamide thermoplastic material. In another approach, the pretensioner rod 53 could be made from a similar thermoplastic material, such as an acetal material or polypropylene material.

Figure 7:
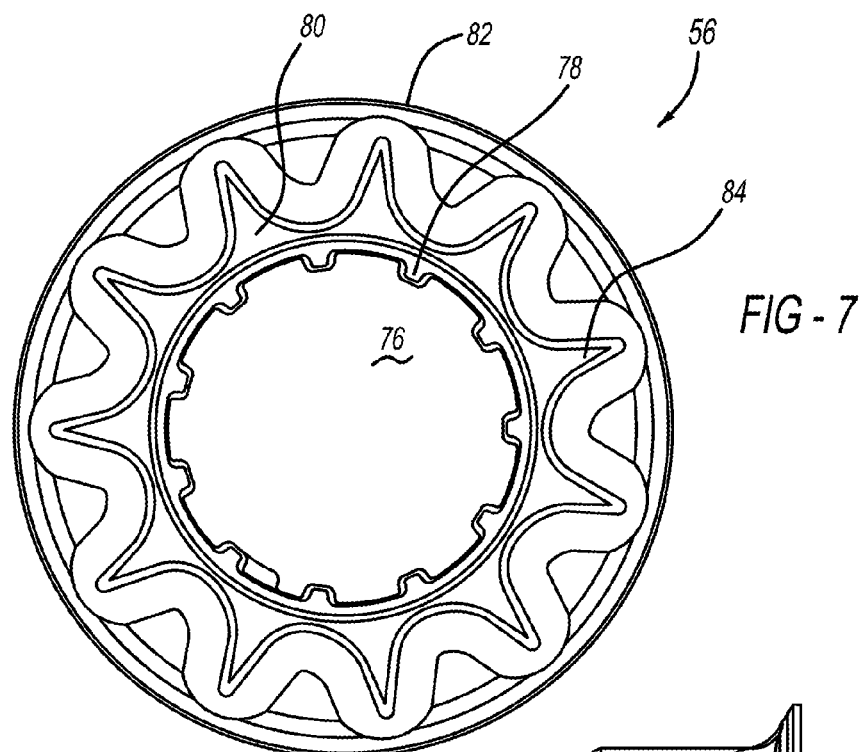
FIG. 7 is a plan view of the sprocket having a plurality of vanes in accordance with an exemplary embodiment.
Figure 8:
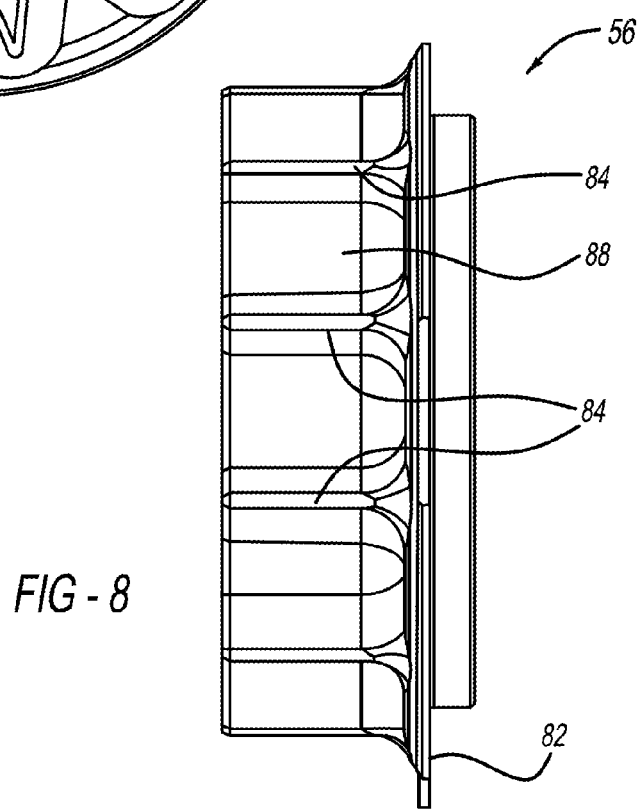
FIG. 8 is a side view of the sprocket in accordance with an exemplary embodiment.
Figure 9:
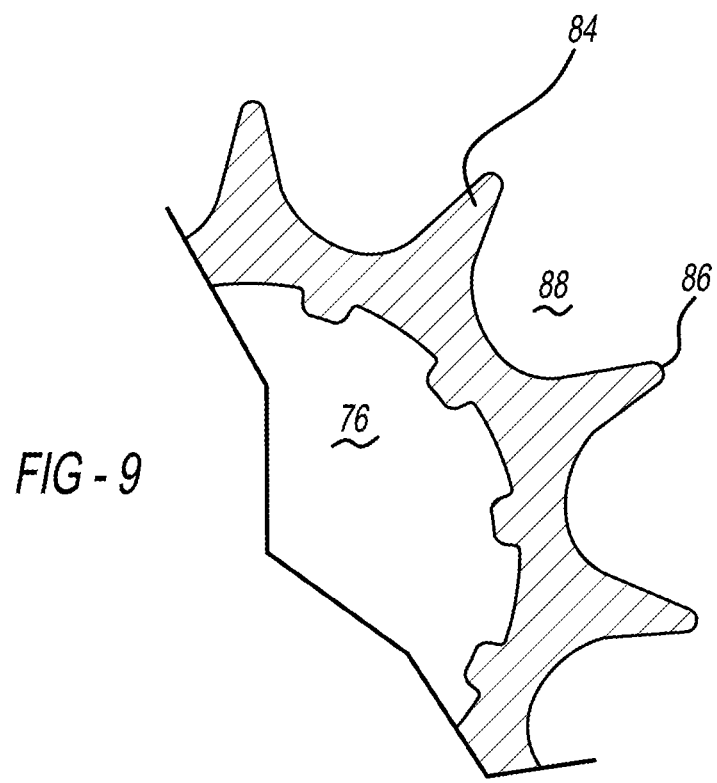
FIG. 9 is a partial view of the sprocket illustrating the shape of the vanes in accordance with an exemplary embodiment.

With reference to FIGS. 7-9, the sprocket 56 has a general annular shape that defines an internal aperture 76. The sprocket 56 further defines a plurality of inward extending teeth 78 that extend into the aperture 76. The teeth 78 are sized and configured to correspond to recesses or depressions that are defined on an external surface of the belt spool 40 (shown in FIG. 3) to connect the sprocket 56 to the belt spool 40 such that they are rotationally coupled. In another approach, the internal aperture 76 could include a single tooth or protrusion to rotationally couple the sprocket 56 to the belt spool 40.

The sprocket 56 includes an annular body portion 80 and a flange portion 82 that projects radially from the base of the annular body portion 80. The sprocket 56 further includes a plurality of vanes 84 that each project radially from the annular body portion 80 as well as longitudinally from the flange portion 82, such that vanes 82 extend between the annular body portion 80 and the flange portion 82.

The vanes 84 each have a generally triangular shape when viewed from the front, with a base that tapers into a point 86 as the vane 84 extends radially outward from the annular body portion 80. The particular width and pitch of the vanes 84 can be selected as desired. The plurality of vanes 84 combine to define cavities 88 that are disposed between adjacent vanes 84.

In one approach, each of the vanes 84 can have the same size and shape and be uniformly distributed around the sprocket 56. In another approach, the vanes 84 can have different sizes and/or be spaced at different intervals. Adjusting the size and spacing of the vanes 84 can alter the amount of rotation and/or the rate of the rotation for the sprocket 84 when the pretensioner system 44 is activated. This variable size and/or spacing is possible due to the actuation by the pretensioner rod 53 rather than by a series of similarly shaped balls. In a pretensioner that uses a plurality of ball-shaped driving elements, the size and spacing is preferably uniform to account for the predetermined shape and size of the balls.

With reference once again to FIG. 4, the housing 54 further include a guide portion 90. The guide portion 90 is disposed within the housing 54 similar to the sprocket 56. More particularly, the guide portion 90 is disposed opposite the exit of the tube 52, and the sprocket 56 is disposed between the guide portion 90 and the tube 52. Accordingly, the pretensioner rod 53 exiting the tube 52 will contact the sprocket 56 prior to contacting the guide portion 90.

The guide 90 has a generally arcuate landing surface 92 that has a concave shape toward the exit of the tube 52. In one approach, the arc of the surface 92 has a constant radius. Further, the center point of the radius of the arc is aligned with the rotational axis of the sprocket 56, such that the radial spacing between the surface 92 and the sprocket 56 is consistent along the length of the surface 92. In another approach, the center point of the radius of the surface 92 could be offset from sprocket axis, such that the radial spacing between the surface 92 and the outer diameter of the sprocket 56 will vary at different points along the surface 92.

The surface 92 includes a first end 96 and second end 98. The first end 96 is disposed opposite the exit of the tube 52 such that the pretensioner rod 53 would engage the first end 96 prior to the second end 98 after exiting the tube 52 and passing the sprocket 56.

The housing 54 further defines an overflow cavity 100 that is disposed opposite the guide 90. The overflow cavity 100 is also disposed adjacent the curvature of the tube 52, and the sprocket 56 is disposed between the guide 90 and the overflow cavity 100. Accordingly, an intermediate portion 101 of the guide 90 is diametrically opposite the overflow cavity 100 across the sprocket 56.

The overflow cavity 100 is sized and configured to allow a portion the pretensioner rod 53 to be received therein during actuation of pretensioner system 44, if necessary. For example, after the pretensioner rod 53 has exited the tube 52 it will contact the guide 90 and be directed in an arcuate path corresponding to the guide 90, such that the pretensioner rod 53 is ultimately directed toward the overflow cavity 100. The pretensioner rod 53 can extend into the overflow cavity 100, and can further be guided along the curvature of the tube 52 that is adjacent the overflow cavity 100. However, it will be appreciated that the pretensioner rod 53 may not necessarily travel far enough during actuation to ultimately reach the overflow cavity 100.

As described above, the retractor assembly 32 includes the gas generator 36 that provides expanding gas in response to a firing signal. The expanding gas causes an increase in pressure within the tube 52, which ultimately causes the pretensioner rod 53 to be forced away from the gas generator 36, through the tube 52, and pass the exit into the sprocket 56 for pretensioning.

Figure 10:
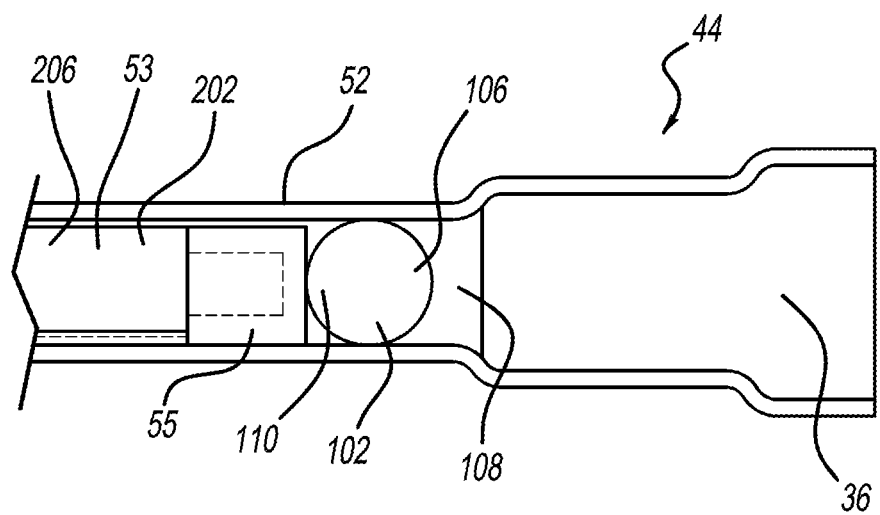
FIG. 10 is a cross-sectional view of a gas generator, a seal, the stopper, and the plastically deformable polymer rod of the seatbelt pretensioning retractor assembly in the non-actuated position in accordance with an exemplary embodiment.

More particularly, as shown in FIG. 10, the pretensioner tube 52 includes a piston or seal member 102. The seal member 102 can have a spherical shape with a spherical outer surface, in one approach. In another approach, the seal member 102 can have a generally cylindrical shape with a cylindrical outer surface. The seal member 102 is slidably disposed within the tube 52 and is operable to drive the pretensioner rod 53 along an actuating direction or path A. As will be understood by those of skill in the art, the seal member 102 may be press-fitted or otherwise fitted inside the tube 52.

As shown in FIG. 10, the seal member 102 defines a proximal end 106 spaced from the gas generator 36 so as to define a gas chamber 108 therebetween. The seal member 102 defines a distal end 110 directed toward the stopper 55 and the pretensioner rod 53.

The stopper 55 is preferably made from aluminum, but could be made from another suitable material of sufficient strength, such as steel, other metal or metal alloy, or reinforced plastic with the seal member 102 being generally softer such that it can provide the described sealing abilities. In an exemplary embodiment, the stopper 55 has an outer perimeter that substantially matches the perimeter of the non-recessed portion 206. The stopper 55 is adjacent the distal end 110 of the seal member 102 and abuts the non-recessed portion 206 of the pretensioner rod 53.

The seal member 102 and the stopper 55 cooperate to transfer the energy from the increased pressure in the gas chamber 108 to the pretensioner rod 53. The pretensioner rod 53, in order to travel through the tube 52 and flex according to the curvature of the tube 52, is sized slightly smaller than the width of the tube 52. Thus, without the seal member 102, gas from the gas generator 36 would flow past the pretensioner rod 53 in the space defined between the pretensioner rod 53 and the tube 52.

The seal member 102 defines a generally elastic structure, and may be composed of various materials known in the art, such as any suitable plastic or polymer (e.g., polyester, rubber, thermoplastic, or other elastic or deformable material). Moreover, the seal member 102 may be die cast, forged, or molded from metal, plastic, or other suitable material. In one embodiment, the seal member 102 is formed using a two-cavity injection molding process. The generally elastic structure allows the shape of the seal member 102 to change slightly in response to pressure, thereby improving the sealing that it provides.

Figure 11:
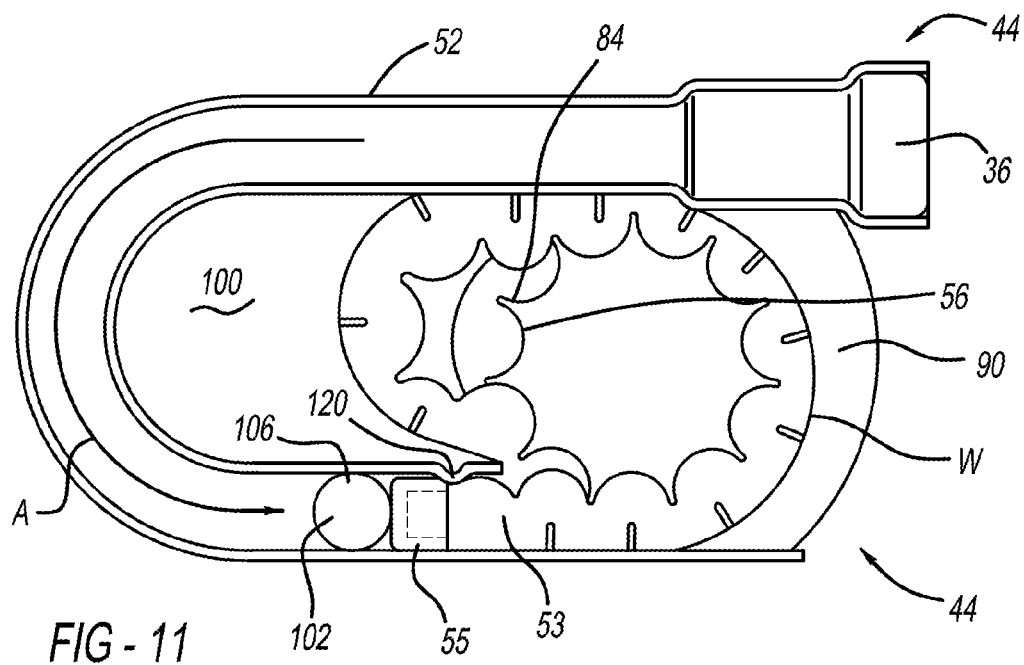
FIG. 11 is a cross-sectional view of the seatbelt pretensioning retractor assembly in an actuated position in accordance with an exemplary embodiment.

Referring to FIGS. 10-11, in operation, the gas generator 36 produces expanding gas that pressurizes the gas chamber 108, thereby enabling the seal member 102 to forcibly drive the pretensioner rod 53 along the actuation path A. As the pretensioner rod 53 is driven through the tube 52, it engages the sprocket 56. More particularly, the pretensioner rod 53 engages the vanes 84 of the sprocket 56. Engagement of the pretensioner rod 53 with the sprocket 56 as the pretensioner rod 53 is driven by expanding gas in the direction of arrow A causes the belt spool 40 (shown in FIG. 3) to rotate, which in turn provides pretensioning.

Activation of the gas generator 36 enables the seal member 102 to resist gas leakage. As previously mentioned, the seal member 102 is composed of a relatively elastic material. Therefore, pressurized gas within the gas chamber 108 causes the proximal end 106 of the seal member 102 to expand, which helps prevent gas from escaping past the seal member 102.

In addition, backpressure generated from the pretensioner rod 53 causes the seal member 102 to expand circumferentially outward due to compression of the seal member 102 against the stopper 55 and the pretensioner rod 53. The pretensioner rod 53 undergoes resistance as it engages the sprocket 56 during actuation, thereby generating backpressure on the stopper 55 and the seal member 102. The circumferential expansion of the seal member 102 provides a tightened seal between the outer surface of the seal member 102 and the inner wall of the pretensioner tube 52. Accordingly, the seal member 102 of the present invention is operable to retain a high seal pressure as well as maintain residual gas pressure within the tube 52.

During pretensioning of the seatbelt there can be a side-effect known as payback, where the tension on the seatbelt caused by the occupant during an event triggering pretensioning can rotate the spool in a direction opposite the pretensioning rotation. This rotation is transferred to the sprocket 56 and the driving elements, causing the driving elements to travel in the reverse direction within the tube 52. Payback can be counteracted by maintaining pressure in the tube 52, but this requires the gas generator 36 to fire for a longer period and additional propellant.

However, in an exemplary embodiment, the pretensioner system 44 described herein includes features configured to counteract the above described payback side-effect as an alternative to or in addition to maintained gas pressure. As described above, the pretensioner rod 53 is preferably made of a plastically deformable material, such as a polymer.

During actuation of the pretensioner system 44, the pretensioner rod 53 exits the tube 52 and contacts the vanes 84 of the sprocket 56, causing the sprocket 56 to rotate. As the pretensioner rod 53 continues past the sprocket 56 causing it to rotate, additional ones of vanes 84 will contact the side of the pretensioner rod 53, causing the pretensioner rod 53 to be compressed and deformed plastically in the area of interference between the vanes 84 and the pretensioner rod 53. This compression will also cause the pretensioner rod 53 to be compressed against the guide 90, creating a press-fit configuration of the pretensioner rod 53 between the sprocket 56 and the guide 90.

Additionally, the pretensioner rod 53 and guide 90 may be made from materials that will weld together at the end of the pretensioning stroke. For example, the materials of the pretensioner rod 53 and guide 90 may be selected such that heat generated from the friction between the pretensioner rod 53 and the guide 90 will cause the pretensioner rod 53 and guide 90 to become welded together along an interface W where the guide 90 and rod 53 contact each other. Once the pretensioner rod 53 and guide 90 are welded together, the pretensioner rod 53 will become locked and prevented or substantially limited from traveling back into the tube 52.

The plastic deformation of the pretensioner rod 53 caused by the vanes 84 will prevent or substantially limit the sprocket 56 from rotating in the opposite direction, thereby preventing or substantially limiting payback.

The welding results from the relatively high heat and pressure generated by the system during actuation. For the pretensioner rod 53 and guide 90 to weld, the materials used for each are preferably in the same family. For example, if the guide 90 is nylon, then the pretensioner rod 53 is preferably nylon. Similarly, if the guide 90 is acetal, then the pretensioner rod 53 is preferably acetal. If the guide 90 is polypropylene, then the pretensioner rod 53 is polypropylene. It will be appreciated that other materials that will weld together under high heat and pressure could also be used. Moreover, it will be appreciated that some different types of materials can weld together.

Another side-effect that can occur during pretensioning is known as a low-resistance condition. This can occur when there is a relatively large portion of the seatbelt webbing that can be taken up or wound by the spool in response to actuating the pretensioner. For example, if there was extra slack in the seatbelt, this slack would be taken up and wound with lower resistance because it would not be acting on the occupant until the slack was taken up. In a low resistance condition, the backpressure of the driving elements is reduced. Reduced backpressure can result in a reduced ability of the sealing element to expand circumferentially against the inner wall surface of the tube in response to the backpressure. This can occur for any type of piston or seal that is configured to expand circumferentially in response to backpressure as part of its sealing process.

With reference to FIGS. 4, 11, and 14-17, to address the side-effect of a low-resistance condition of the pretensioner system 44, in an exemplary embodiment, the tube 52 includes a projection 120 extending within the tube 52 near an end of the tube 52 to form constriction portion 130 proximate to where the pretensioner rod 53 exits, thereby reducing the cross-sectional area of the tube 52 in a distinct location. That is, the opening diameter, width, or dimension(s) of the constriction portion 130 is smaller than the diameter, width, or dimension(s) of adjacent portions of the tube 52 portions, such as, for example, the portions of the tube 52 that are upstream from the constriction portion 130.

As will be discussed in further detail below, the recess 210 is aligned with the projection 120 along the actuating direction or path A such that during actuation and/or pretensioning, the recessed portion 208 of the pretensioner rod 53 is not obstructed by the projection 120. Moreover, the constriction portion 130 is sized such that there is enough space that at least the recessed portion 208 of the pretensioner rod 53 can travel past the constriction portion 130, but the stopper 55 and seal member 102 will be blocked from travelling past the constriction portion 130. When the stopper 55 and the seal member 102 are blocked from advancing past the constriction portion 130, the constriction portion 130 provides additional backpressure. Accordingly, the seal member 102 will circumferentially or radially expand in response to this backpressure, thereby providing an improved seal in low-resistance conditions. This improved sealing will prevent or limit the potential for gas to escape from the tube in low-resistance conditions.

The projection 120 defining the constriction portion 130 can be formed in a variety of ways and have a variety of shapes while providing the above described functionality. In one approach, shown in FIG. 14, the projection 120 is in the form of a crimp or bump 132 in the tube 52, such that the sidewall of the tube 52 maintains substantially the same thickness. The bump 132 is integrally formed with the tube as a monolithic structure, at least in the area of the constriction portion 130. Put another way, the bump 132 is not a separate component or material attached to the tube 52. The bump 132 protrudes into the tube 52, and has a corresponding depression 134 on an outer surface of the tube 52 (facing the overflow cavity 100, for example). The bump 132 has a convex shape within the tube 52 and the depression 134 has a corresponding concave shape facing the overflow cavity 100.

Figure 15:
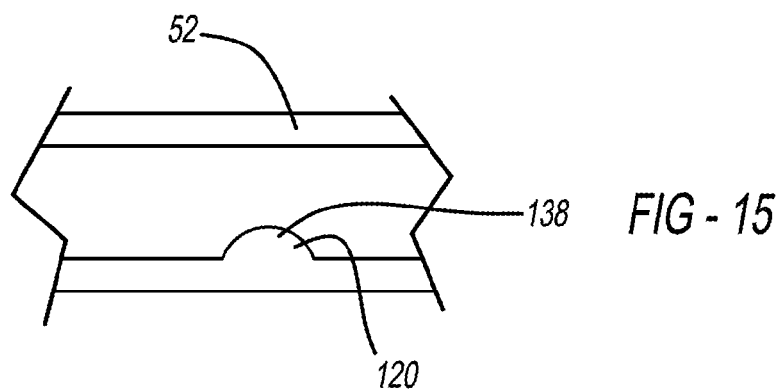
FIG. 15 is a cross-sectional view of another embodiment of the constriction portion.

In another approach, shown in FIG. 15, the projection 120 could be in the form of an increased thickness portion 138 that is integral with the tube 52. This is similar to the bump 132, but does not have a corresponding depression on outer surface of the tube 52.

Figure 16:
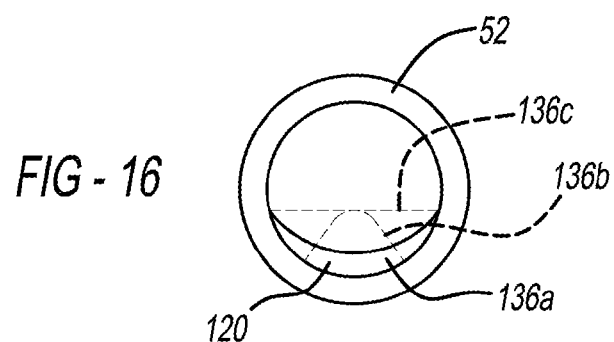
FIG. 16 is a cross-sectional view of another embodiment of the constriction portion.

In another approach, shown in FIG. 16, the projection 120 is in the form a separate piece or crescent 136 that is attached to the tube 52 within the tube 52. The crescent 136a, 136b, or 136c can be attached via welding, adhesive, mechanical fasteners, or the like.

Figure 17:
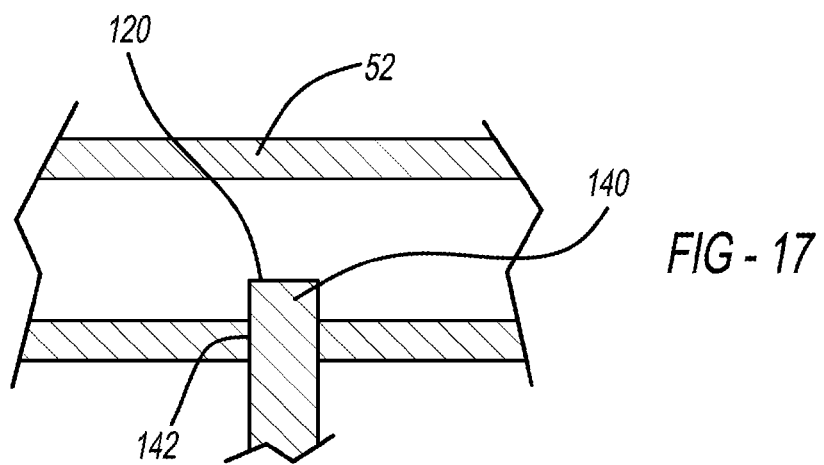
FIG. 17 is a cross-sectional view of another embodiment of the constriction portion.

In another approach, shown in FIG. 17, the projection 120 could be in the form of a plate 140 that is inserted through an opening 142 formed in the sidewall of the tube 52. The plate 140 is removably inserted through the opening 142 and secured to the tube 52 via known securement mechanisms. In another approach, the plate 140 can be fixedly secured after insertion through the opening 142. The use of the plate 140 allows for different shapes and sizes and materials to be easily selected and installed, if desired.

Figure 12:
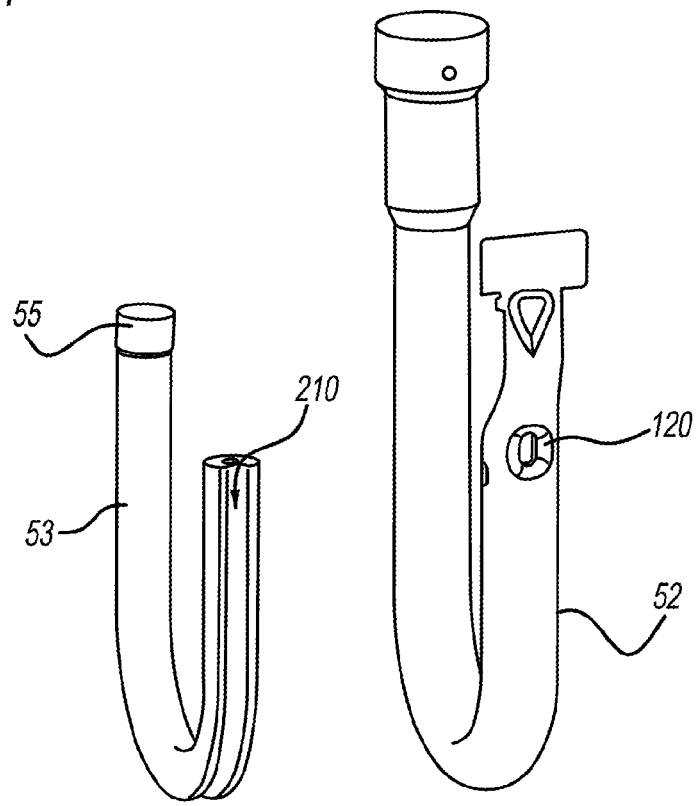
FIG. 12 is a partial exploded perspective view of the tube, the plastically deformable polymer rod, and the stopper in accordance with an exemplary embodiment.

In the above approaches, the projection 120 with the recess 210 of the pretensioner rod 53 aligned therewith may be disposed along an inboard portion of the tube 52 as illustrated in FIG. 4, or alternatively, may be disposed along an outboard portion of the tube 52 as illustrated in FIG. 12. Advantageously, in an exemplary embodiment, disposition of the projection 120 on the inboard portion of the tube 52 facilitates the pretensioner rod 53 sliding across the outboard portion of the tube 52 during travel. The centrifugal force of the pretensioner rod 53 as it travels through the tube 52 will tend to force the pretensioner rod 53 toward the outboard portion of the tube 52, so locating the projection 120 on the inboard portion helps reduces the potential for the constriction portion 130 to add resistance to the pretensioner rod 53. Alternatively and advantageously, in an exemplary embodiment, disposition of the projection 120 on the outboard portion of the tube 52 facilitates the sprocket 56 engaging the fully or solid side of the pretensioner rod 53 (e.g., sprocket 56 engaging side of the pretensioner rod 53 opposite the recess 210) during actuation to facilitate locking the pretensioner rod 53 with the sprocket 56 to prevent or reduce any translation of the pretensioner rod 53 in a direction opposite the actuating direction or path A.

As described above, the pretensioner rod 53 has the non-recessed portion 206 at its proximal end portion 202, where the non-recessed portion 206 has a larger diameter or cross-sectional dimension(s) than the recessed portion 208. In one approach, the non-recessed portion 206 has a diameter or cross-sectional dimension(s) that is larger than the width or cross-sectional dimension(s) of the tube 52 at the constriction portion 130. Accordingly, with the non-recessed portion 206 disposed upstream of the constriction portion 130, the constriction portion 130 will prevent the non-recessed portion 206 from passing.

In another approach, the non-recessed portion 206 can be smaller than the width or cross-sectional dimension(s) of the tube 52 at the constriction portion 130. With the non-recessed portion 206 being small enough to pass the constriction potion 130, it can pass beyond the constriction portion 130.

Figure 18:
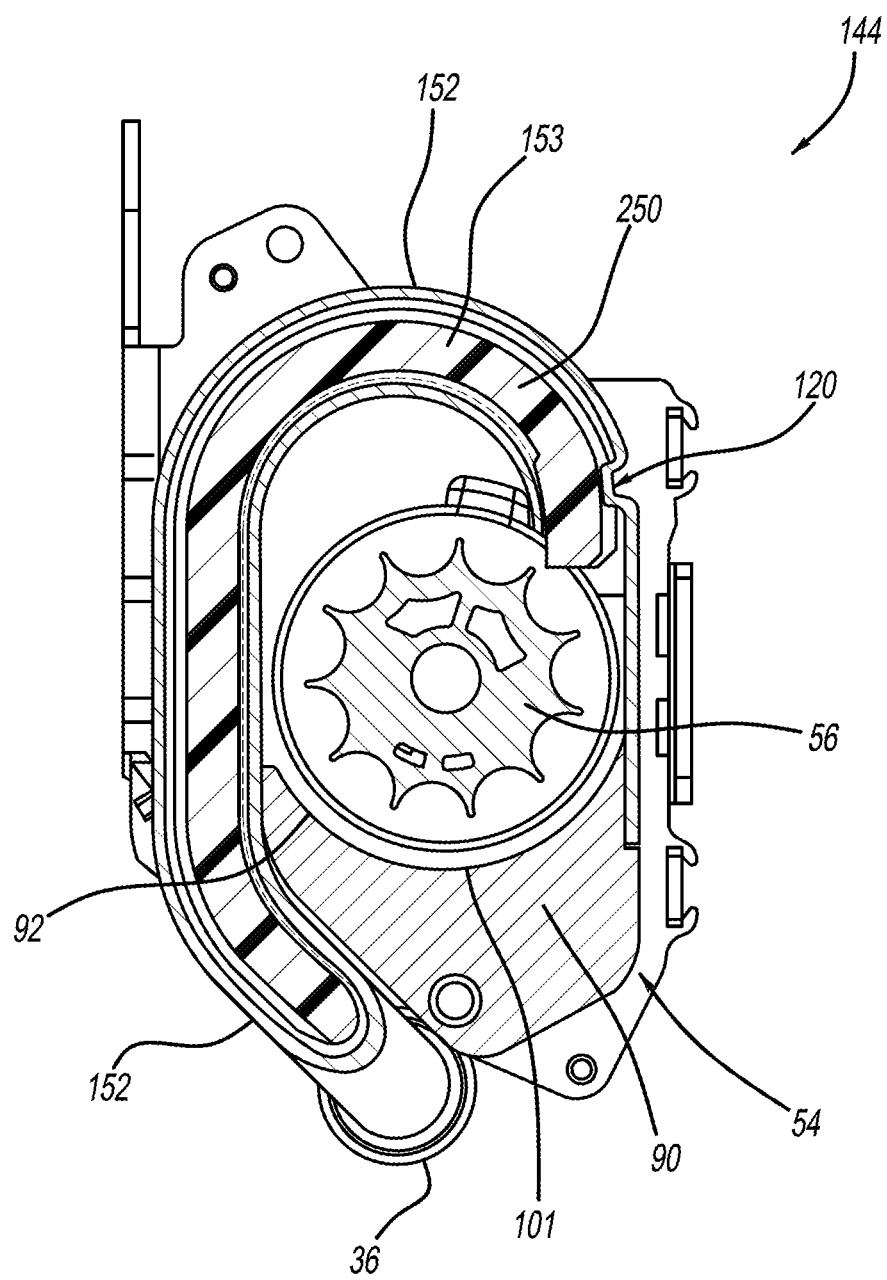
FIG. 18 is a cut-away view of the seatbelt pretensioning retractor assembly illustrating a tube, a plastically deformable polymer rod, and a sprocket in a non-actuated position in accordance with another exemplary embodiment.

FIG. 18 provides a cut-away illustration of a pretensioner system 144 in accordance with another exemplary embodiment. The pretensioner system 144 shown in FIG. 18 is similarly configured to and operates as described above in relation to the pretensioner system 44 shown in FIG. 4 including the housing 54, the gas generator 36, the sprocket 56, and the guide portion 90, but with the exceptions that the pretensioner tube 152 has the projection 120 on the outboard portion of the tube 152 for interfacing with a pretensioner rod 153 disposed within the tube 152. As will be discussed in further detail below, the pretensioner rod 153, e.g., a plastically deformable polymer rod, has an elongate shape and is flexible within the tube 152 and is similarly configured to and operates as described above in relation to the pretensioner rod 53 shown in FIGS. 4-6 but with the exception that the pretensioner rod 153 includes a recessed section 250 to further facilitate bending of the pretensioner rod 153 through the tube 152 during translation towards the sprocket 56.

In particular and with reference also to FIGS. 19-21D, the pretensioner rod 153 when disposed outside of the pretensioner tube 152 prior to insertion therein, has a generally straight shape, and when inserted into the tube 152 it will bend and flex in accordance with the tortuous shape of the tube 152. As shown, the pretensioner rod 153 has a generally circular cross-section in one form. In another approach, the pretensioner rod 153 could have a non-circular cross-section, such as a generally rectangular cross-section, generally triangular cross-section, or other polygonal cross-section that allows the pretensioner rod 153 to be inserted into the pretensioner tube 152 and adapt to the tortuous shape of the pretensioner tube 152 when inserted. For purposes of discussion, the pretensioner rod 153 will be discussed as having a generally circular cross-section.

As illustrated and as discussed above, the pretensioner rod 153, when disposed outside of the pretensioner tube 152, has a generally straight shape and extends in the longitudinal direction 200 from its proximal end portion 202 to its distal end portion 204. The proximal end portion 202 is disposed towards the gas generator 36 when the pretensioner rod 153 is installed within the pretensioner system 144. In an exemplary embodiment, the pretensioner tube 152 has a cross-section that varies along its length to define the non-recessed portion 206 and the recessed portion 208 that defines the recess 210 as discussed above in relation to the pretensioner rod 53 shown in FIGS. 5-6.

On a side opposite the recessed portion 208 is the recessed section 250 that defines a recess 252 and that extends in the longitudinal direction 200. In an exemplary embodiment, the cross-section of the pretensioner tube 152 varies along its length to define a non-recessed section 254 at the distal end portion 204 and the recessed section 250 extends from the non-recessed section 254 to a proximal-most end of the proximal end portion 202 to define the recess 252. As such, the recessed section 250 extends along the majority of the overall length of the pretensioner rod 153. In an exemplary embodiment, it has been found that by not extending the recess 252 through the distal end portion 204, the distal end portion 204 has a relatively larger or fuller cross-sectional area for engaging the sprocket 56 during translation, thereby reducing the amount of stripping of the pretensioner rod 153 which can occur at first contact with the sprocket 56, thereby increasing performance of the pretensioner system 144. Moreover, it has been found that by not having the recess/groove 210 extend through the proximal end portion 202, the proximal end portion 202 has a relatively larger or fuller cross-sectional area for the stopper 55 to contact to reduce the amount of initial compression on the pretensioner rod 153 during actuation of the gas generator 36, thereby increasing performance of the pretensioner system 144.

In an exemplary embodiment, the recessed section 250 is sized such that a thickness (indicated by double headed arrow 256) of the pretensioner rod 153 defined normal to the recessed section 250 is less than a width (indicated by double headed arrow 258) of the pretensioning rod defined normal to the thickness to facilitate bending of the pretensioner rod 153 through the pretensioner tube 152 during translation to the sprocket 56. Without being limited by theory, it is believed that the recessed section 250 helps reduce the section modulus across the thickness 256 of the pretensioner rod 153 to allow the pretensioner rod 153 to bend more easily across its thickness 256. Further, it is believed that this reduction in section modulus helps prevent twisting of the pretensioner rod 153 and reduce friction as the rod 153 is being advanced through the pretensioner tube 152 during translation, thereby increasing performance of the pretensioner system 144. Moreover, the recessed section 250 facilitates insertion of the pretensioner rod 153 into the pretensioner system 144 during assembly due to its reduced cross-sectional area. In an exemplary embodiment, the non-recessed section 254 has a length L10 of from about 15 to about 25 mm, such as about 20 mm; the recessed section 250 has a length L20 of from about 60 to about 145 mm; the thickness 256 of the pretensioner rod 153 is, for example at the proximal end portion 202, from about 2.5 to about 7 mm; and the width 258 of the pretensioner rod 153 is, for example at the proximal end portion 202, from about 4 to about 8 mm.

In an exemplary embodiment, when the pretensioner rod 153 is disposed outside of the pretensioner tube 152, the recessed section 250 has a substantially flat, planar surface defining the recess 252. In another example, the recessed section 250 has a recessed ruled surface that defines the recess 252. Non-limiting alternative forms of the recess 252 may also be used.

In an exemplary embodiment, the pretensioner rod 153 may include a chamfer 260 at its distal end portion 204. The chamfer 260 may advantageously be positioned on the same side as the recess 210 to help reduce the force required to advance the pretensioner rod 153 past the projection 120 so as to minimize or prevent the pretensioner rod 153 from being obstructed by the projection 120. Alternatively, the chamfer 260 may be positioned on the side opposite the recess 210 as illustrated in FIGS. 5-6.

In an exemplary embodiment, the pretensioner rod 153 also includes a positive feature 216, e.g., nub or post, extending proximally from the proximal end portion 202. A stopper 55 is configured to receive the positive feature 216 to couple the stopper 55 to the proximal end portion 202 of the pretensioner rod 153 as discussed above in relation to the pretensioner rod 53 shown in FIGS. 5-6.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A seatbelt pretensioning retractor assembly for use in a passenger vehicle, the seatbelt pretensioning retractor assembly comprising:
a housing adapted for being mounted to a vehicle structure and having an interior cavity;
a tube having an arcuate and curved shape having a first end for fluid communication with a gas generator and a second end in fluid communication with the interior cavity of the housing;
a sprocket rotatably mounted to the housing and fixedly coupled to a spindle adapted for taking up seatbelt webbing during pretensioning, wherein the sprocket has a plurality of vanes;
a driving element comprising a plastically deformable polymer rod configured to extend in a longitudinal direction and having a recessed portion defining a recess that extends generally in the longitudinal direction, wherein the plastically deformable polymer rod is disposed within the tube and is translatable through the tube in a first direction toward the sprocket in response to an actuation by the gas generator;
a stopper coupled to an end portion of the plastically deformable polymer rod; and
a seal member disposed between the gas generator and the stopper, wherein the tube includes a projection extending within the tube adjacent to the exit to define a constriction portion that has an opening dimension smaller than an inside dimension of adjacent portions of the tube, and wherein the recess is aligned with the projection in the first direction and the constriction portion is sized to permit the recessed portion of the plastically deformable polymer rod to pass therethrough while preventing the stopper from passing therethrough.

2. The seatbelt pretensioning retractor assembly of claim 1, wherein the recess is in a form of a groove defined by the recessed portion.

3. The seatbelt pretensioning retractor assembly of claim 1, wherein the recessed portion has a recessed ruled surface that defines the recess.

4. The seatbelt pretensioning retractor assembly of claim 1, wherein the plastically deformable polymer rod has a proximal end portion that is disposed towards the gas generator and a distal end portion that is opposite the proximal end portion, and wherein the stopper is coupled to the proximal end portion and the recessed portion extends distally from the proximal end portion to and includes the distal end portion.

5. The seatbelt pretensioning retractor assembly of claim 4, wherein the proximal end portion comprises a non-recessed portion that has a diameter, cross-sectional dimension, and/or perimeter greater than the recessed portion.

6. The seatbelt pretensioning retractor assembly of claim 5, wherein the stopper abuts the non-recessed portion and has an outer perimeter that substantially matches the perimeter the non-recessed portion.

7. The seatbelt pretensioning retractor assembly of claim 4, wherein the plastically deformable polymer rod and the stopper are fixedly couple together by a positive feature extending generally in the longitudinal direction received by a negative feature.

8. The seatbelt pretensioning retractor assembly of claim 1, wherein the plastically deformable polymer rod has a recessed section extending in the longitudinal direction on a side opposite the recessed portion.

9. The seatbelt pretensioning retractor assembly of claim 1, wherein the projection is integrally formed with the tube.

10. The seatbelt pretensioning retractor assembly of claim 9, wherein the projection is in a form of a protrusion in a sidewall of the tube.

11. The seatbelt pretensioning retractor assembly of claim 9, wherein the projection is in a form of a crimp in a sidewall of the tube.

12. The seatbelt pretensioning retractor assembly of claim 9, wherein the constriction portion and the adjacent portions of the tube form a monolithic structure.

13. The seatbelt pretensioning retractor assembly of claim 1, wherein the projection is in a form of a separate projection member fixedly mounted to a sidewall of the tube.

14. The seatbelt pretensioning retractor assembly of claim 1, wherein the projection comprises a plate inserted through a hole defined in a sidewall of the tube.

15. The seatbelt pretensioning retractor assembly of claim 1, wherein the projection and the recess are located along an inboard portion of the tube.

16. The seatbelt pretensioning retractor assembly of claim 1, wherein the projection and the recess are located along an outboard portion of the tube.

17. The seatbelt pretensioning retractor assembly of claim 1, wherein the stopper is a circumferential shape that generally matches the internal circumferential shape of the tube.

18. The seatbelt pretensioning retractor assembly of claim 1, wherein the seal member expands circumferentially outward in response to backpressure from the constriction portion during the actuation of the gas generator.

19. The seatbelt pretensioning retractor assembly of claim 1, wherein the housing has a guide portion, and wherein the plastically deformable polymer rod is locked against translation in a second direction that is opposite the first direction after the plastically deformable polymer rod has engaged the sprocket to provide pretensioning and/or the plastically deformable polymer rod becomes locked against translation in the second direction that is opposite the first direction during pretensioning due to welding between the plastically deformable polymer rod and the guide portion.

20. A seatbelt pretensioning retractor assembly for use in a passenger vehicle, the seatbelt pretensioning retractor assembly comprising:
a housing adapted for being mounted to a vehicle structure and having an interior cavity;
a tube having an arcuate and curved shape having a first end for fluid communication with a gas generator and a second end in fluid communication with the interior cavity of the housing;
a sprocket rotatably mounted to the housing and fixedly coupled to a spindle adapted for taking up seatbelt webbing during pretensioning, wherein the sprocket has a plurality of vanes;
a driving element comprising a plastically deformable polymer rod configured to extend in a longitudinal direction and having a recessed portion defining a recess that extends generally in the longitudinal direction and a recessed section extending in the longitudinal direction on a side opposite the recessed portion, wherein the plastically deformable polymer rod is disposed within the tube and is translatable through the tube in a first direction toward the sprocket in response to an actuation by the gas generator; and
a seal member disposed between the gas generator and the plastically deformable polymer rod, wherein the tube includes a projection extending within the tube adjacent to the exit to define a constriction portion that has an opening dimension smaller than an inside dimension of adjacent portions of the tube, wherein the recess is aligned with the projection in the first direction and the constriction portion is sized to permit the recessed portion of the plastically deformable polymer rod to pass therethrough, and wherein the recessed section is sized such that a thickness of the plastically deformable polymer rod defined normal to the recessed section is less than a width of the plastically deformable polymer rod defined normal to the thickness to facilitate bending of the plastically deformable polymer rod through the tube during translation in the first direction.

* * * * *